No. 12,348. REISSUED MAY 23, 1905.

C. L. ROGERS.

TANK CAR.

APPLICATION FILED APR. 10, 1905.

2 SHEETS—SHEET 1.

ATTEST.

H. G. Fletcher.

B. T. Funk

INVENTOR.

CHARLES L. ROGERS.

BY. Bakewell & Cornwall

ATTY'S

No. 12,348. REISSUED MAY 23, 1905.

C. L. ROGERS.

TANK CAR.

APPLICATION FILED APR. 10, 1905.

2 SHEETS—SHEET 2.

ATTEST.

H. J. Fletcher.

R. F. Funk

INVENTOR.

CHARLES L. ROGERS

BY Bakewell & Cornwall

ATTY'S.

No. 12,348. Reissued May 23, 1905.

UNITED STATES PATENT OFFICE.

CHARLES L. ROGERS, OF SLIGO, MISSOURI, ASSIGNOR TO AMERICAN CAR & FOUNDRY COMPANY, OF ST. LOUIS, MISSOURI, A CORPORATION OF NEW JERSEY.

TANK-CAR.

SPECIFICATION forming part of Reissued Letters Patent No. 12,348, dated May 23, 1905.

Original No. 763,116, dated June 21, 1904. Application for reissue filed April 10, 1905. Serial No. 254,903.

*To all whom it may concern:*

Be it known that I, CHARLES L. ROGERS, a citizen of the United States, residing at the city of Sligo, county of Dent, and State of Missouri, have invented a certain new and useful Improvement in Tank-Cars, of which the following is a full, clear, and exact description, such as will enable others skilled in the art to which it appertains to make and use the same, reference being had to the accompanying drawings, forming part of this specification, in which—

Figure 1:
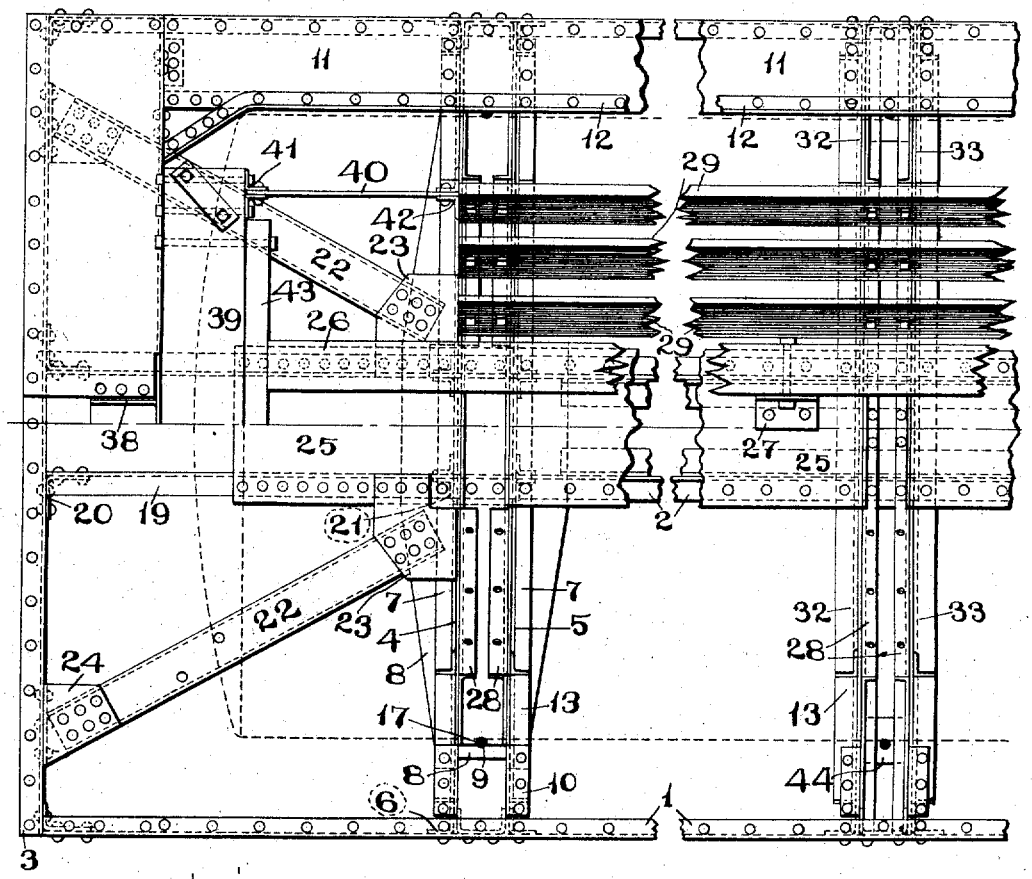
Figure 2:
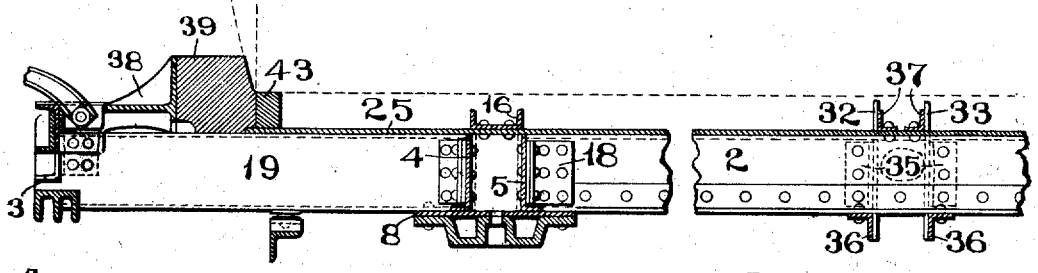
Figure 3:
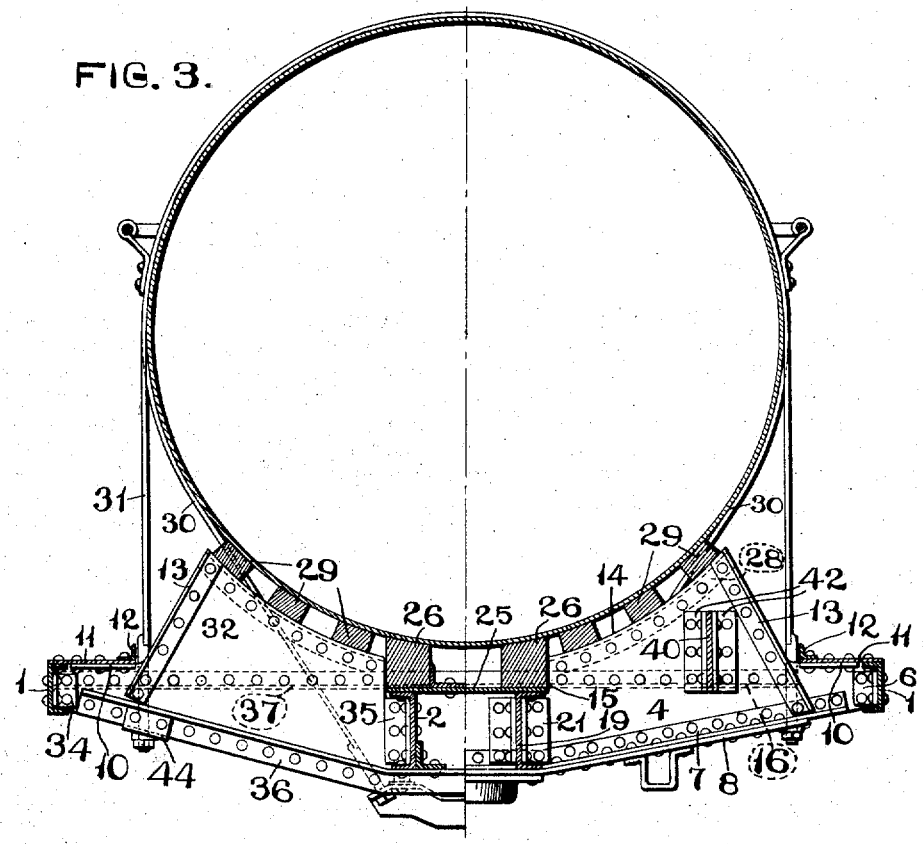
Figure 4:
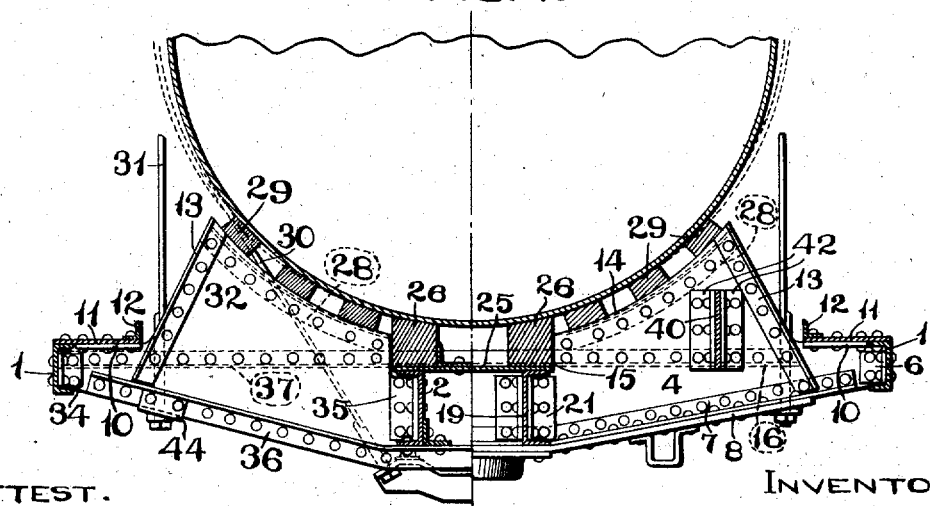
Figure 5:
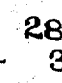
Figure 6:
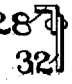

Figure 1 is a fragmentary plan view of a portion of the car. Fig. 2 is a vertical longitudinal sectional view through the underframing of the car. Fig. 3 is a divided sectional view showing the relative positions of the parts when the largest size of tank is employed. Fig. 4 is a similar view illustrating the positions of the parts when a smaller-sized tank is employed. Fig. 5 is a detail edge view of a portion of the saddle-plate, illustrating the relative position of the edge angle when a large-sized tank is employed; and Fig. 6 is a like view illustrating the positions of the angle with relation to the plate when a small-sized tank is employed.

This invention relates to car construction, and particularly to the class of tank-cars.

One of the objects of the invention is to provide an improved construction of tank-support and bolster as applied to the underframing.

Other objects and advantages as well as the novel details of construction of this invention will be specifically described hereinafter, it being understood that changes in form, proportion, and minor details of construction may be resorted to without departing from the spirit or sacrificing any of the advantages thereof.

In the preferred embodiment of the invention as illustrated in the accompanying drawings, 1 designates the side sills and 2 the center sills. The side sills are connected by the end sills 3. The bolsters employed in connection with this form of car are illustrated as comprising parallel plates 4 and 5, extending from side sill to side sill and connected thereto by angle-plates 6. The lower edges of these plates 4 and 5 converge toward the center, being downwardly inclined, and their edges are braced by the angles 7, which extend nearly the entire length of the plates and terminate adjacent the side sills 1. The bottom cover-plates (designated by the reference-numeral 8) are fastened to the angles 7 by suitable devices, and I prefer to construct these cover-plates 8 wider at the center than at the ends. The respective ends of the plates 8 are provided with holes 9, the purpose of which will be apparent hereinafter. Each bolster side plate is provided with a relatively deep portion and a relatively shallow portion, the shallow portion being at the point of connection between the plates and the side sills, which shallow portions are provided with horizontal upper edges 10, which constitute supports for the floor-sheet 11. The inner edges of the floor-sheets are provided with longitudinally-disposed angles 12, secured thereto to strengthen them. The bolster side plates extend above the underframing of the car, and the ends of the upstanding portions are inclined from the shallow portions to the highest points of the plate, said edges being braced by the angles 13. The upper edges of the plates are arcuate—that is to say, they are curved to conform to the contour of the tank which they are to receive. These arcuate edges are designated by the reference-numeral 14, and they are intersected by recesses 15, as will be explained hereinafter.

16 designates the channel, which is intermediately carried by the plates and which in the present instance comprises the top cover-plate of the bolster. The center sills are connected to the sides of the respective bolsters by means of the angle-plates 18, and the draft-sills (designated by the reference-numeral 19) are terminally connected to the opposite side plate of each bolster and to the end sills by similar angle-plates, (designated by the reference-numerals 20 and 21.)

The bolsters, draft-sills, and end sills are braced by the diagonal braces 22, carried by the plates 23 and 24. By reference to Figs. 1 3 and 4 it will be noticed that a sheet or plate 25 is secured to the top flanges of the center sills and the draft-sills to form a bed for the longitudinally-disposed tank-sills 26, which are disposed within the recesses 15 of the respective plates, and these sills 26 are held rigid on the plates by the angles 27. By arranging the side plates of the bolsters as just described said plates serve a dual purpose—that is, they provide the side walls or side plates for the bolsters and also constitute the saddles for the tank. The arcuate edges of the plates are reinforced by removable angles, designated by the reference-numeral 28, and in actual practice it is intended to make these angles removable, so that angles formed on different arcs can be substituted from time to time to accommodate the car to tanks of varying sizes. For instance, the curvature of the upper edges of the respective plates may be struck on the arc coinciding with the arc on which the outer wall of a determined size of tank is formed. If it is desirable to change the size of the tank, it will only be necessary to remove the angles 28 and substitute others struck on a different arc to conform to the size of the substituted tank. This can be done without changing the sills 26 or disturbing any other part of the car except the longitudinally-disposed strips 29, which can readily be removed, and the straps 30 and 31.

Interposed between the bolsters are pairs of saddles, substantially the same in form as the saddles which comprise the side walls or plates of the respective bolsters, and these saddles comprise plates designated by the reference-numerals 32 and 33. These intermediate saddles, however, are formed of four pieces, as clearly shown in Figs. 3 and 4, and they are terminally secured to the side sills and the center sills by the angle-plates 34 and 35. The lower edges of these plates 32 and 33 are reinforced by the angles 36, which extend entirely across the car and under the center sills, to which they are secured. Intermediate angles, designated by the reference-numeral 37, are provided for these intermediate saddles, and these angles extend from side sill to side sill and are secured to the bed-plate 25 by suitable fastening devices. The intermediate saddles are also formed with relatively deep and relatively shallow portions, so as to assist the side plates of the bolsters in supporting the tank and providing supports for the floor-sheet 11. The draft-sills carry castings 38 for the head-blocks 39, against which the ends of the tank rest to prevent a longitudinal movement of the tank, and interposed between the head-blocks 39 and the end side plates of the bolsters are spacing bars or braces 40, connected to the head-blocks and side plates by the angle-plates 41 and 42. Transverse tank-sills 43 are also carried by the head-blocks 39, on which the tank may rest. The straps 31 pass over the tank and terminally engage the clips 44, connected to the angles at the lower edges of the respective plates of the intermediate saddles. The straps which pass between the bolster-plates rest in the notches 17 and are fastened to the lower cover-plates 8 by suitable nuts, so that they will be efficiently held in place.

It will be apparent that a car constructed in accordance with the one just described will be capable of resisting the strains to which it will ordinarily be subjected, can be easily set up, and that tanks can readily be substituted one for the other without altering the construction of the car or disturbing the saddles other than to change the angles 28, which will require but a minimum amount of labor.

Having thus described my invention, what I claim as new, and desire to secure by Letters Patent, is—

1. A car having body-bolsters and tank-supporting saddles comprising the sides of the body-bolsters and extending above the cover-plates of the bolsters with their upper edges conforming to the contour of the tank, and floor-sheets carried by the saddles; substantially as described.

2. A car having saddles comprising pairs of plates connected to the side sills and center sills, and bottom cover-plates connected to the pairs of the first-named plates, said saddles having relatively shallow portions and floor-sheets carried by the relatively shallow portions; substantially as described.

3. A car having side sills and saddles of varying depths, the shallow portions of the saddles being connected to the side sills, and floor-sheets carried by the said shallow portions; substantially as described.

4. A car having tank-supporting saddles comprising plates provided with inclined lower edges and arcuate upper edges, the arcuate upper edges extending above the underframing of the car, said saddles having relatively shallow portions adjacent the side sills, and floor-sheets carried by the relatively shallow portions; substantially as described.

5. A car having tank-supporting saddles comprising plates provided with inclined lower edges and arcuate upper edges, and connecting cover-plates secured to the lower edges of the saddles said first-named plates having floor-carrying portions: substantially as described.

6. A car having means for supporting a tank and terminally connected to the side sills, said means comprising plates having relatively shallow portions adjacent to the respective side sills, and floor-sheets carried by the relatively shallow portions; substantially as described.

7. The combination with the underframing of a car, of a bolster carried by the underframing and having a notched lower cover-plate, a tank carried by the car, and straps over the tank and engaging the notched cover-plate, and a securing means on each strap; substantially as described.

8. The combination with side sills, and end sills of a car, of a bolster extending from side sill to side sill, center sills interposed between the bolsters, draft-sills interposed between the bolsters and end sills, head-blocks carried by the draft-sills, and braces between the head-blocks and bolsters; substantially as described.

9. The combination with side sills, and end sills of a car, of a bolster extending from side sill to side sill, center sills interposed between the bolsters, draft-sills interposed between the bolsters and end sills, head-blocks carried by the draft-sills, and braces 40 between the head-blocks and bolsters; substantially as described.

In testimony whereof I hereunto affix my signature, in the presence of two witnesses, this 7th day of April, 1905.

CHARLES L. ROGERS.

Witnesses:
F. R. CORNWALL,
GEORGE BAKEWELL.